March 9, 1926. 1,576,117
J. GUTHRIE
WHEEL
Filed Dec. 5, 1919
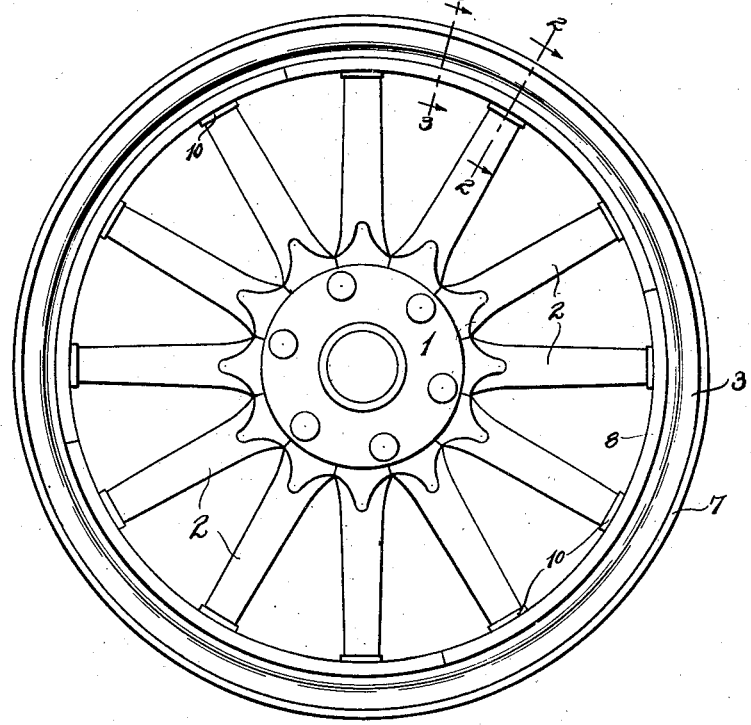
Fig-1
Fig.2.
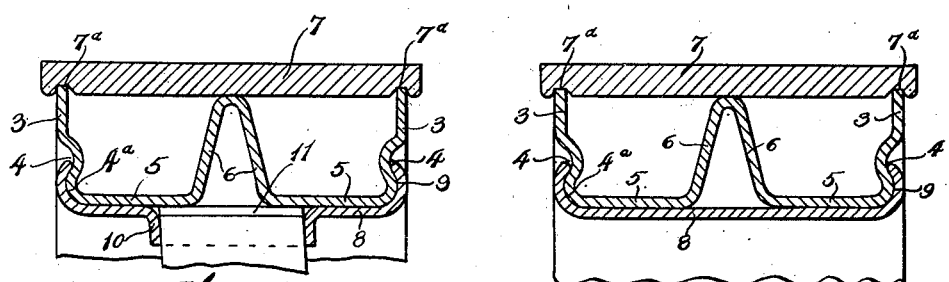
Fig-3
Fig.4.
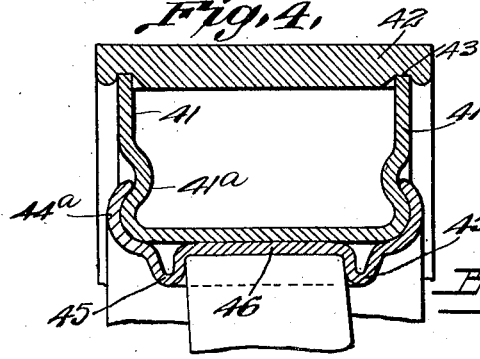
Inventor
James Guthrie,
By Hull, Smith, Brock & West
Attys Patented Mar. 9, 1926.

1,576,117

UNITED STATES PATENT OFFICE.

JAMES GUTHRIE, OF ELYRIA, OHIO.

WHEEL.

Application filed December 5, 1919. Serial No. 342,761.

*To all whom it may concern:*

Be it known that I, JAMES GUTHRIE, a citizen of the United States, residing at Elyria, in the county of Lorain and State of Ohio, have invented a certain new and useful Improvement in Wheels, of which the following is a full, clear, and exact description, reference being had to the accompanying drawings.

This invention relates to vehicle wheels and more particularly to the fellies and the manner of constructing the same and of securing the outer ends of the spokes thereto. It is the general purpose and object of the invention to provide a wheel which can be produced very economically and in quantity production by reason of the particular construction of the felly.

Referring to the drawings, Fig. 1 represents a side elevation of a wheel constructed in accordance with my invention, and Figs. 2 and 3 sectional details corresponding respectively to the lines 2—2 and 3—3 of Fig. 1; and Fig. 4 is a sectional detail of a modified form of my invention.

Describing the various parts by reference characters and with particular reference to Figs. 1-3 inclusive, 1 denotes the hub and 2 the spokes of a wheel of ordinary or standard construction. The felly shown in these views is particularly well adapted for the support of large single tires or of dual tires. It comprises a double-channeled felly body, a band within the interior of said body having cups for the reception of the spoke ends, and an outer tire base. The felly body may be conveniently formed from sheet metal pressed to shape and comprising a pair of side walls 3 each having between the inner and outer edges thereof a recess 4, the said walls being rounded outwardly, as shown at 4ª, adjacent to and including their junction with the inner walls 5. The inner walls 5 are flat or cylindrical and are connected to walls 6 forming a V-shaped rib projecting outwardly from the adjacent edges of the walls 5 and providing, with the outer edges of the walls 3, a seat for the tire base 7, said base being provided with recesses 7ª to receive the outer edges of the walls 3.

Secured to the inner surface of the felly body is a band (indicated generally at 8) extending across the inner face of said body and having its outer edges bent into engagement with the rounded inner side edges 4ª of the body 3, as shown at 9, the outer edges of the parts 9 being located within the recesses 4. The band 8 is provided with collars 10 for the reception of the outer ends of the spokes 2, there being a metal plate 11 within each collar and preferably co-extensive with the end of the cooperating spoke, each plate 11 forming a cup with its collar and extending across the V-shaped space provided within the central rib of the felly body.

The band 8 may be a continuous band or made of several segments, each carrying two or more collars as indicated in Fig. 1, wherein four such segments are shown, each carrying three collars 10. The felly may be produced cheaply by a pressing or stamping operation and the construction of the felly not only serves accurately to position the outer ends of the spokes both radially and circumferentially and retain such ends securely in place, but strengthens and backs the felly body against spreading laterally.

A modification of my invention is shown in Fig. 4. In this view, 41 denotes a felly body, preferably of metal, with a tire base 42 seated upon the outer edges of the body by means of recesses 43. The band 44 in this case is secured to the inner surface of the body 41, as by spot welding, and is provided at suitable intervals with cups which may be provided in substantially the same manner as is the case with the preceding modification. Each cup is provided with a wall 45 of double metal and a bottom 46 against which the end of a spoke 2 abuts. The outer edges of the band 44 are rounded, as indicated at 44ª, whereby they engage the corresponding rounded portions of the felly body 41, the outer edges of the parts 44ª being located within recesses 41ª in such felly body.

It will be understood that the bands within the felly bodies of all the metal embodiments of my invention may be secured in place by means of spot welding, in addition to the interlocking engagement provided at the sides of some of the same.

In all forms of my invention I have produced a felly which is extremely economical of manufacture, using for this purpose in each instance a felly body which can be produced in quantity at small expense and reinforcing and protecting the same by means of a band applied to the inner face thereof and provided with means for locating and holding the outer ends of the spokes, In each instance, the felly body is provided with a combined reinforcing and spoke-seating band. The construction not only enables me to produce a cheap felly, but one which is light in weight and which, by reason of its mode of reinforcement, is capable of withstanding all of the ordinary incidents of use.

Having thus described my invention, what I claim is:

1. A felly comprising an annular outer felly body adapted to receive a tire base, and an annular reinforcing band within said body having inwardly projecting collars for the reception of spoke ends, the felly body having rounded seats at opposite sides thereof, each seat having an annular recess extending about said body and the band having its lateral edges conforming to and fitting within said seats and recesses thereby to reinforce said body.

2. A felly comprising an annular outer body adapted to receive a tire base, and an annular reinforcing band within said body and extending around and engaging the sides thereof to reenforce said body against lateral spreading, said band having inwardly projecting collars for the reception of spoke ends.

3. A felly comprising an annular outer body adapted to receive a tire base, and an annular sheet-metal reinforcing band within and secured to said body and having inwardly projecting double-walled cups adapted to receive the ends of spokes.

4. A felly comprising an annular outer body provided with a rounded seat on each side thereof adjacent to its inner face, and an annular sheet metal reinforcing band within the said body and having rounded sides engaging the said seats and provided with inwardly extending double walled cups for the outer ends of the spokes.

In testimony whereof, I hereunto affix my signature.

JAMES GUTHRIE.